United States Patent [19]

Swank

[11] Patent Number: 5,670,106
[45] Date of Patent: Sep. 23, 1997

[54] METHOD FOR MAKING ORGANICALLY BASED POLYMER/THERMOPLASTIC PRODUCTS AND APPARATUS

[75] Inventor: Rodney Swank, Westminster, Calif.

[73] Assignee: Merizo Enterprises L.L.C., Sandy, Utah

[21] Appl. No.: 416,226

[22] Filed: Apr. 4, 1995

[51] Int. Cl.⁶ ............................................. B29C 47/10
[52] U.S. Cl. ............................ 264/211.21; 264/40.7; 264/349; 366/76.6; 425/205; 425/376.1; 426/513; 426/516
[58] Field of Search ................ 264/211.21, 211.11, 264/330, 349, 40.7, 40.4; 425/205, 376.1; 426/516, 513; 366/76.6

[56] References Cited

U.S. PATENT DOCUMENTS

| | | | |
|---|---|---|---|
| 2,103,546 | 12/1937 | Morrell | 264/211.11 |
| 2,568,332 | 9/1951 | Genovese | 425/376.1 |
| 3,256,115 | 6/1966 | Stearns et al. | |
| 3,559,561 | 2/1971 | Page et al. | 425/376.1 |
| 3,583,680 | 6/1971 | Aust et al. | 425/205 |
| 3,651,877 | 3/1972 | Wise et al. | |
| 3,904,429 | 9/1975 | Eastman et al. | 426/242 |
| 3,956,981 | 5/1976 | Pitt | 264/211.11 |
| 4,431,598 | 2/1984 | Korpman | 264/40.7 |
| 4,804,505 | 2/1989 | Venzke | 264/40.7 |
| 4,983,114 | 1/1991 | Hauck | 425/205 |
| 4,985,269 | 1/1991 | Irvin et al. | 426/516 |
| 5,186,990 | 2/1993 | Starcevich | |
| 5,252,271 | 10/1993 | Jeffs | |
| 5,261,743 | 11/1993 | Moller | 264/40.7 |

FOREIGN PATENT DOCUMENTS

| | | | |
|---|---|---|---|
| 3600566 | 7/1987 | Germany | 425/205 |
| WO90-14935 | 12/1990 | WIPO | 264/211.11 |
| WO92-08759 | 5/1992 | WIPO | 264/211.11 |

*Primary Examiner*—Jeffery R. Thurlow
*Attorney, Agent, or Firm*—Thorpe, North & Western

[57] ABSTRACT

An extruding apparatus for manufacturing organically based polymer/thermoplastic products. A rotational screw cooking extruder includes an extrusion chamber having a receiving port for receiving extrudate ingredients thereinto. An ejection port is formed as part of the chamber, and a rotatable screw member is disposed within the chamber for compressing extrudate ingredients within the chamber and advancing the ingredients toward and through the ejection port. A channeling device is provided for holding a plurality of extrudate ingredients and channeling them separately and simultaneously into the cooking extruder to maintain the ingredients in a desired orientation with respect to each other at the time of their insertion into the extruder.

23 Claims, 2 Drawing Sheets

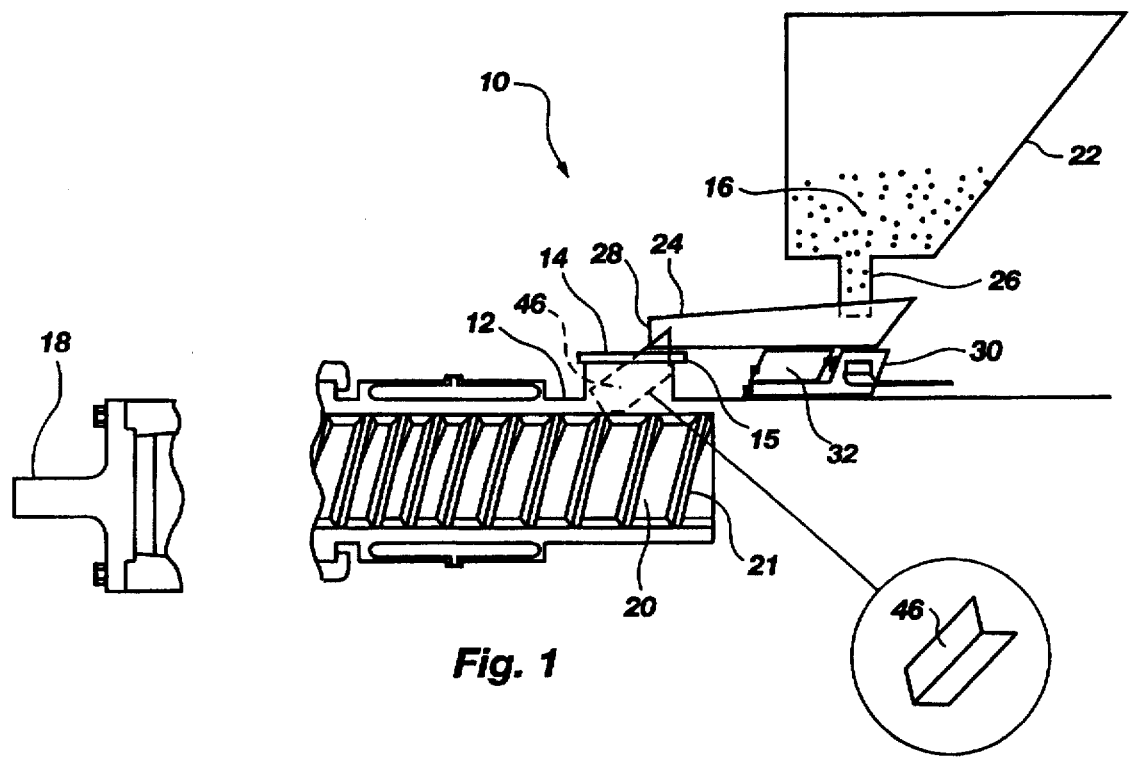
Fig. 1
Fig. 1A
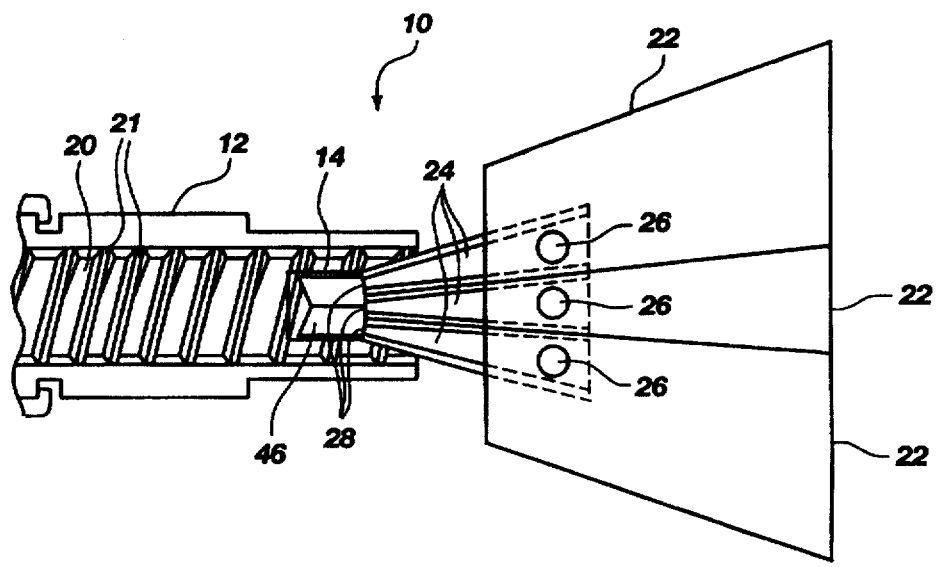
Fig. 2

METHOD FOR MAKING ORGANICALLY BASED POLYMER/THERMOPLASTIC PRODUCTS AND APPARATUS

BACKGROUND OF THE INVENTION

1. The Field of the Invention

The present invention relates generally to organically based polymer/thermoplastic products and their methods of manufacture. More particularly, it concerns a feeding apparatus for feeding the ingredients of an organically based polymer/thermoplastic extrudate into a rotational screw cooking extruder.

2. The Background Art

Organically based polymer/thermoplastic products have become an important part of the plastics industry. The enhanced environmental compatibility of organic based products has motivated efforts in the industry to devise methods for mass producing such products, such as extrusion methods. Cooking extruders have been developed for injecting heat and compressive energy into a material to be extruded. Many different extrudate products are known to be produced by cooking extruders, such as packaging materials and the like. Environmental concern has motivated the production of such products using environmentally safe plastic materials which are preferably recyclable.

Concern for the environment has thus heightened public awareness of the environmental compatibility of the products used in society, and has had a major impact on the entire plastics industry and related industries. Companies involved in the manufacture of plastic materials and consumers of such materials are now undertaking assertive approaches in implementing environmentally safe procedures and materials. The economic viability of many such companies depends more and more on whether the company presents an "environmentally correct" image. Accordingly, the plastics industry and related industries are aggressively seeking new and improved methods and materials to avoid the production of non-recyclable products.

Accordingly, industries have focused upon methods and materials for producing environmentally safe plastic-based products. Since many such products are disposable, there is an urgent need to provide the products with higher strengths and quality so as to minimize the amount and weight of material used to produce them. Material strength can be maximized and product weight minimized by maintaining the product ingredients in a homogenous configuration during fabrication. However, the rotational screw cooking extruders known in the prior art produce inherent vibrations and shifting of ingredients, causing the ingredients to separate during fabrication and thereby compromise the strength and quality of the resulting product. It is conventional practice in the industry to insert a pre-mix of ingredients into the cooking extruder which then settles and separates to a degree before the final product is completed.

OBJECTS AND SUMMARY OF THE INVENTION

It is therefore an object of the present invention to provide a feeding apparatus for feeding ingredients into a rotational screw cooking extruder.

It is another object of the invention to provide such a feeding apparatus capable of feeding separate extrudate ingredients separately and simultaneously into a rotational screw cooking extruder.

It is a further object of the invention, in accordance with one aspect thereof, to provide such a feeding apparatus which can maintain the extrudate ingredients in a desired orientation relative to one another when feeding the ingredients into a rotational screw cooking extruder.

It is an additional object of the invention, in accordance with one aspect thereof, to provide such a feeding apparatus which is capable of selectively increasing and reducing the rate of advancement of one or more extrudate ingredients into the cooking extruder.

It is still another object of the invention, in accordance with one aspect thereof, to provide such a feeding apparatus capable of conveying extrudate ingredients into a cooking extruder as separate flows of material thereinto.

It is yet another object of the invention, in accordance with one aspect thereof, to provide such a feeding apparatus capable of selectively preventing the flow of one or more ingredients into the cooking extruder while conveying one or more other of the ingredients into the extruder.

The above objects and others not specifically recited are realized in a specific illustrative embodiment of an extruding apparatus. A rotational screw cooking extruder includes an extrusion chamber having an receiving port for receiving extrudate ingredients thereinto. An ejection port is formed as part of the chamber, and a rotatable screw member is disposed within the chamber for compressing extrudate ingredients within the chamber and advancing the ingredients toward and through the ejection port. A channeling device is provided for holding a plurality of extrudate ingredients and channeling them separately and simultaneously into the cooking extruder to maintain the ingredients in a desired orientation with respect to each other at the time of their insertion into the extruder.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 1 illustrates a feeding apparatus in conjunction with a breakaway view of a rotational screw cooking extruder, in accordance with the principles of the present invention;

FIG. 1A illustrates an isometric view of a guide chute of the feeding apparatus of FIG. 1.;

FIG. 2 illustrates a plan view of the feeding apparatus and cooking extruder of FIG. 1;

DETAILED DESCRIPTION OF PRESENTLY PREFERRED EMBODIMENTS

Figure 3:
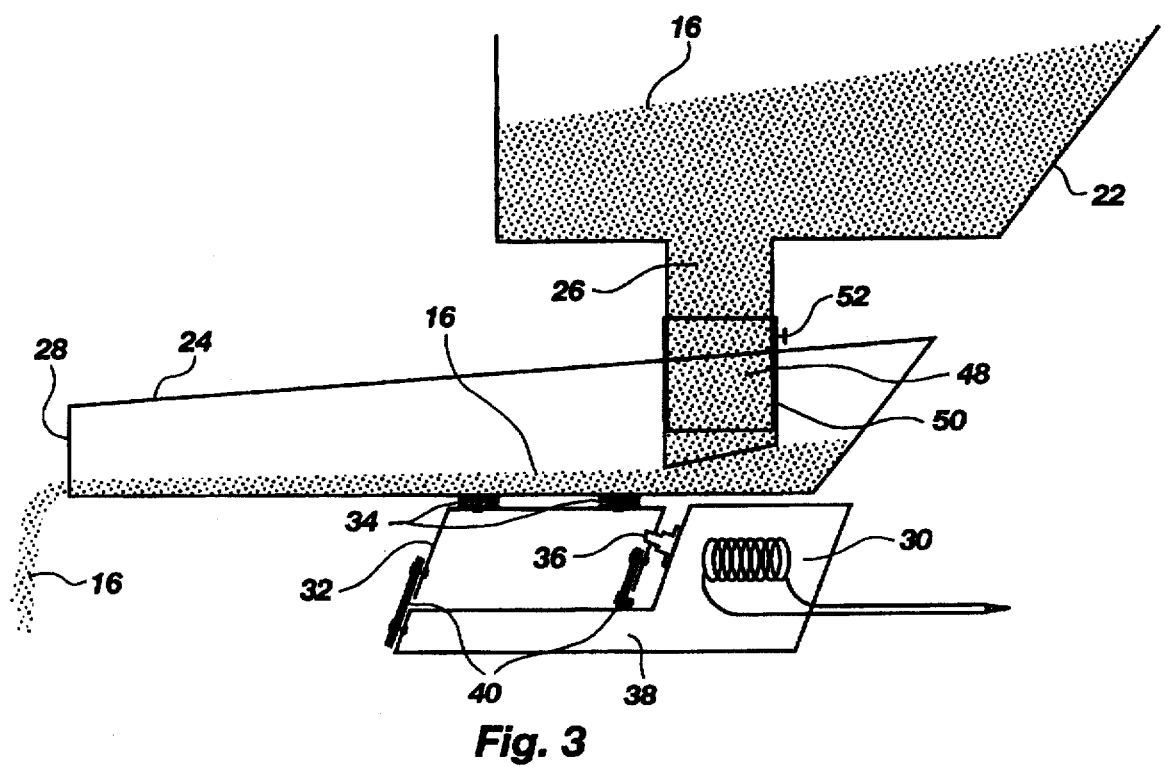
FIG. 3 illustrates an enlarged side view of the feeding apparatus of FIG. 1.

Referring now to the drawings, there is shown an extruding apparatus, generally designated at 10, made in accordance with the present invention. The apparatus 10 includes an extrusion chamber 12 having an receiving port 14 for receiving extrudate ingredients 16 thereinto. An ejection port 18 is formed on the chamber 12. A rotatable screw member 20 is disposed within the chamber 12 and is configured for compressing the extrudate ingredients 16 within the chamber 12 and advancing the ingredients toward and through the ejection port 18. The apparatus 10 further includes hopper means such as a plurality of hoppers 22, and channeling means such as a plurality of feed mechanisms or channels 24, which cooperatively form insertion means for inserting a plurality of separate extrudate ingredients separately and simultaneously into the receiving port 14 of the extrusion chamber 12.

The plurality of hoppers 22 are configured for holding the plurality of separate extrudate ingredients 16 therein. Discharge passages 26 are formed on the hoppers 22 to function as hopper discharge means for discharging the ingredients 16 from each hopper 22 separately. The feed channels 24 are disposed in respective communication with the plurality of discharge passages 26, such that each hopper 22 is confined to discharge extrudate ingredients 16 into a single feed channel 24.

Each feed channel 24 includes a dispensing opening 28 positioned in communication with the receiving port 14 of the extrusion chamber 12. Any suitable positioning means, such as positioning lip 15, can be used for positioning the dispensing openings 28 of each feed channel 24 into communicable proximity with the receiving port 14 so as to enable extrudate ingredients to pass from the feed channels 24 to the extrusion chamber 12. The feed channels 24 function as channeling means for (i) receiving the extrudate ingredients 16 separately from the discharge passages 26, and (ii) selectively channeling each said ingredient 16 separately and simultaneously into the receiving port 14 of the extrusion chamber 12.

The feed channels 24 operate in conjunction with an advancing means for selectively advancing extrudate ingredients residing in the feed channels through the dispensing openings 28 of the channels and into the receiving port 14 of the extrusion chamber 12. A preferred embodiment of the advancing means includes a magnetic means such as electromagnet 30, and a spring means such as spring-supported extension body 32, for cooperatively oscillating the feed channels 24 in reciprocating movement.

As indicated by the representation of the extrudate ingredients 16 and the segregated feed channels 24, the hoppers 22 and channels 24 operate to introduce a plurality of the individual ingredients 16 separately and simultaneously along a plurality of segregated movement paths into the extrusion chamber 12. As readily understandable to one of ordinary skill, the ingredients 16 will remain substantially segregated and unmixed as they pass from the channels 24 into the guide chute 46 and as they fall from the chute 46 into the extrusion chamber 12.

More specifically, a plurality of the extension bodies 32 are secured to the plurality of feed channels 24, respectively, such as by bolts 34, so that the extension bodies are confined to movement with the feed channels. The extension bodies 32 each includes at least a portion of magnetically attractable material 36. A plurality of support bases 38 are respectively intercoupled with the extension bodies 32 by the spring means, which are preferably leaf springs 40 or other suitable spring members. The support base 38 may be formed integral and unitary with part of the electromagnet 30 support structure, or separate therefrom.

The electromagnets 30 are independently and selectively actuatable, and are respectively positioned adjacent to the magnetically attractable portions 36 of the extension bodies 32 and are thereby configured for selectively moving said magnetically attractable portions, and thus the extension bodies, against resistance of the leaf springs 40 such that the electromagnets and the leaf springs cooperatively pull the extension bodies 32, and thus the feed channels 24, back and forth in reciprocating, vibrational movement. The electromagnets 30 may be electronically connected to a control panel (not shown) in such a manner to enable an operator to selectively activate and deactivate one or more of the electromagnets, thereby selectively preventing at least one of the extrudate ingredients 16 from flowing into the receiving port 14 of the extrusion chamber 12 while conveying at least another of the ingredients 16 into the chamber. The electromagnets 30 and spring-supported extension bodies 32 operate as vibration means for vibrating the feed channels 24 to thereby cause extrudate ingredients 16 residing in the channels to move through the dispensing openings 28 of the channels and into the receiving port 14 of the extrusion chamber 12.

It will be appreciated that the hoppers 22, feed channels 24, electromagnets 30 and spring-supported extension bodies 32 function as means for conveying the plurality of separate extrudate ingredients 16 as separate flows of material into the receiving port 14 of the extrusion chamber 12. As shown most clearly in FIG. 2, the feed channels 24 preferably comprise a plurality of segregated movement paths, in order to accomplish the introduction of the ingredients 16 as separate flows of material into the receiving port 14, as mentioned above. The feed channels 24 define interior passages 42 and are preferably chute members having open top sections 44. The open top sections 44 permit access to the interior passages 42, which may be useful to break apart buildup formations of the ingredients 16 within the passages 42.

The channeling function of the invention also includes a guide chute 46 which functions as guide means for receiving the separate extrudate ingredients 16 simultaneously from the feed channels 24 and guiding the ingredients into the receiving port 14 of the extrusion chamber 12 in substantially the same relative orientation in which the ingredients were received by the guide chute 46. The guide chute 46 is disposed in simultaneous communication with the dispensing openings 28 of the feed channels 24. Preferably, the guide chute 46 extends from the openings 28 downwardly toward, and preferably into, the receiving port 14 of the extrusion chamber 12. The chute 46 is thereby configured to receive the separate extrudate ingredients 16 simultaneously from the feed channels 24 and guide the ingredients into the receiving port 14 of the extrusion chamber 12. The guide chute 46 preferably has a V-shaped cross section as shown most clearly in FIG. 1A.

Figure 4:
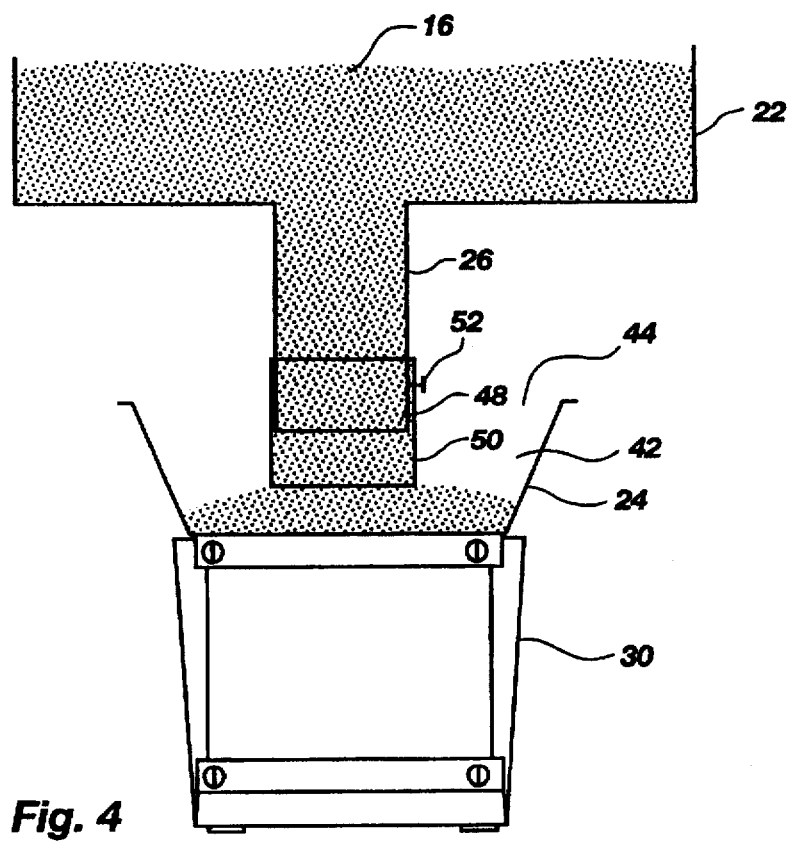
FIG. 4 illustrates a rear cutaway view of the feeding apparatus of FIGS. 1 and 3.

Referring now to FIGS. 3-4, the discharge passages 26 preferably include a duct 48 formed on the hoppers 22 and an extension sleeve 50 slidably disposed around the duct 48 and extending downwardly into one of the feed channels. The extension sleeve 50 is selectively slidable upwardly and downwardly to thereby enable an operator to selectively increase and reduce a rate of advancement of at least one of the extrudate ingredients 16 into the receiving port 14 of the extrusion chamber 12. It will be appreciated by those of ordinary skill in the art that a higher flow rate of ingredient 16 within the feed channel 24 can be achieved by increasing the distance between the end of the discharge passage 26 and the bottom of the feed channel 24. Similarly, the flow rate of ingredient 16 within the feed channel 24 can be decreased by placing the discharge passage 26 closer to the bottom of the feed channel 24. The raising and lowering is accomplished by the slidable sleeve 50, which can be secured at a desired position by any suitable structure, such as a set screw 52. This arrangement enables an operator to selectively control the feed rate of one or more of the plurality of ingredients 16. The slidable extension sleeve 50 is thus both a flow reduction means and a flow increasing means for selectively reducing and increasing the flow of ingredient 16 into the extrusion chamber 12.

In accordance with the principles of the present invention, a preferred method for manufacturing organically based polymer/thermoplastic products with a rotational screw cooking extruder, said cooking extruder having an extrusion chamber with a receiving port for receiving the ingredients thereinto and a rotatable screw member disposed within the chamber for advancing the ingredients through an ejection port of the chamber, said process comprising the steps of:

(a) introducing a plurality of organically based polymer/thermoplastic extrudate ingredients separately and simultaneously into the receiving port of the extrusion chamber of the cooking extruder; and (b) simultaneously (i) rotating the screw member of the cooking extruder, (ii) introducing the ingredients into the receiving port as in step (a), and (iii) otherwise operating the cooking extruder to thereby introduce cooking heat and compression into the ingredients in such a manner that said ingredients become combined and subsequently ejected from the ejection port of the chamber in the form of an organically based polymer/thermoplastic extrudate.

The apparatus 10 is particularly well suited to the production of organic-based, biodegradable plastic products such as loose-fill packaging materials, "fast food" utensils, insulation, plank for sign board, ultra light and ultra dense plastics, mod making material for investment casting, book binding, flower pots, toys, oil absorption material such as for environmental cleanup activities, and the like. In addition, a wide range of new and unique industrial and consumer products are possible as a result of this invention. One of the advantages of the apparatus 10 is its capacity to introduce the extrudate ingredients 16 into the extrusion chamber 12 in a desired orientation relative to one another, at variable rates.

If the ingredients are not arranged in proper proportions and orientations at the time they are cooked and compressed within the extrusion chamber 12, then homogeneity is sacrificed which reduces the strength and quality of the resulting product. Prior art cooking extruders convey a premix of the ingredients in a such a manner that the ingredients become separated and disoriented before they are compressed and cooked in the extrusion chamber. By selectively and variably inserting the ingredients separately and simultaneously into the extrusion chamber 12, the apparatus 10 enables precise and selective orientation of the ingredients with respect to one another in a manner which has not been discovered or utilized in the prior art. The guide chute 46 has been found to be highly effective in maintaining the orientation of the ingredients 16 from the time they are discharged from the feed channels 24 to the time they enter the extrusion chamber 12. The chute 46 prevents the heavier ingredients from entering the extrusion chamber 12 faster than or out of sequence with respect to other ingredients, and can be positioned to accomplish a desired insertion orientation of the ingredients with respect to the flights 21 of the screw member 20.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An extruding apparatus comprising:

a cooking extruder including an extrusion chamber having a receiving port for receiving extrudate ingredients, an ejection port formed on the chamber, and a rotatable screw member disposed within the chamber and being configured for compressing extrudate ingredients within the chamber and advancing said ingredients toward and through the ejection port;

feeding means for separately introducing a plurality of individual extrudate ingredients separately and simultaneously along a plurality of segregated, open-top movement paths into the receiving port of the extrusion chamber.

2. The extruding apparatus as defined in claim 1, wherein the feeding means comprises means for conveying the plurality of separate extrudate ingredients as separate flows of material into the receiving port of the extrusion chamber.

3. The extruding apparatus as defined in claim 2, wherein the feeding means comprises flow prevention means for selectively preventing at least one of the separate extrudate ingredients from flowing into the receiving port of the extrusion chamber while conveying at least another of the ingredients into said receiving port.

4. The extruding apparatus as defined in claim 2, wherein the feeding means comprises flow reduction means for selectively reducing the flow of at least one of the separate flows of material into the receiving port of the extrusion chamber.

5. The extruding apparatus as defined in claim 2, wherein the feeding means comprises flow increasing means for selectively increasing the flow of at least one of the separate flows of material into the receiving port of the extrusion chamber.

6. The extruding apparatus as defined in claim 1, wherein the feeding means comprises:

a plurality of hoppers configured for holding the plurality of separate extrudate ingredients therein, said hoppers including hopper discharge means for discharging the ingredients from each hopper separately; and channeling means disposed in communication with the hopper discharge means for (i) receiving the extrudate ingredients separately from the hopper discharge means, and (ii) selectively channeling each said ingredient separately and simultaneously into the receiving port of the extrusion chamber.

7. The extruding apparatus as defined in claim 6, wherein the hopper discharge means comprise discharge passages formed on the hoppers and wherein the channeling means comprises:

a plurality of feed channels disposed in respective communication with the plurality of discharge passages, such that each hopper is confined to discharge extrudate ingredients into a single feed channel, each feed channel including a dispensing opening positioned in communication with the receiving port of the extrusion chamber; and advancing means for selectively advancing extrudate ingredients residing in the feed channels through the dispensing openings of the channels and into the receiving port of the extrusion chamber.

8. The extruding apparatus as defined in claim 7, wherein the feed channels define interior passages and further comprise chute members having open top sections, said chute members being thereby configured to permit access to the interior passages through said top sections.

9. The extruding apparatus as defined in claim 7, wherein the advancing means comprises vibration means for vibrating the feed channels to thereby cause extrudate ingredients residing in the channels to move through the dispensing openings of the channels and into the receiving port of the extrusion chamber.

10. The extruding apparatus as defined in claim 9, wherein the vibration means comprises magnetic means and spring means for cooperatively oscillating the feed channels in reciprocating movement.

11. The extruding apparatus as defined in claim 10, wherein the vibration means further comprises:
   a plurality of extension bodies secured to the plurality of feed channels, respectively, such that said extension bodies are confined to movement with said feed channels, each extension body including at least a portion of magnetically attractable material;
   a plurality of support bases respectively intercoupled with the extension bodies by the spring means, said spring means comprising a plurality of spring members each of which is attached to one of the support bases and to one of the extension bodies;
   wherein the magnetic means comprises a plurality of independently and selectively actuatable electromagnets respectively positioned adjacent to the magnetically attractable portions of the extension bodies and being thereby configured for selectively moving said magnetically attractable portions, and thus the extension bodies, against resistance of the spring members such that the electromagnets and the spring members cooperatively pull the extension bodies, and thus the feed channels, back and forth in reciprocating, vibrational movement.

12. The extruding apparatus as defined in claim 7, wherein the channeling means further comprises guide means for receiving the separate extrudate ingredients simultaneously from the feed channels and guiding said ingredients into the receiving port of the extrusion chamber in substantially the same relative orientation in which said ingredients were received by said guide means.

13. The extruding apparatus as defined in claim 12, wherein the guide means comprises a guide chute disposed in simultaneous communication with the dispensing openings of the feed channels and extending from said openings downwardly toward the receiving port of the extrusion chamber so as to be configured to receive the extrudate ingredients simultaneously from the feed channels and guide said ingredients into the receiving port of the extrusion chamber.

14. The extruding apparatus as defined in claim 7, wherein at least one of the discharge passages comprises a duct formed on one of the hoppers and an extension sleeve slidably disposed around the duct and extending downwardly into one of the feed channels, said extension sleeve being selectively slidable upwardly and downwardly to thereby enable a user to selectively increase and reduce a rate of advancement of at least one of the extrudate ingredients into the receiving port of the extrusion chamber.

15. A feeding apparatus for feeding extrudate ingredients into a rotational screw cooking extruder, said cooking extruder having an extrusion chamber with a receiving port for receiving the ingredients thereinto and a rotatable screw member disposed within the chamber for advancing the ingredients through an ejection port of the chamber, said feeding apparatus comprising:
   hopper means for holding a plurality of individual extrudate ingredients and discharging the individual ingredients separately and simultaneously; and
   channeling means disposed in communication with the hopper means for (i) receiving the extrudate ingredients separately from the hopper means, and (ii) selectively channeling said plurality of extrudate ingredients separately and simultaneously along a plurality of segregated movement paths, respectively, into the receiving port of the extrusion chamber and guiding and maintaining said plurality of ingredients in a desired orientation as said ingredients are channeled into said receiving port.

16. The feeding apparatus as defined in claim 15, wherein the hopper means further comprises a plurality of hoppers and a plurality of discharge passages formed on the hoppers such that each hopper has a discharge passage, and wherein the channeling means further comprises:
   a plurality of feed channels disposed in respective communication with the plurality of discharge passages, such that each hopper is confined to discharge extrudate ingredients into a single feed channel, each feed channel including a dispensing opening positioned in communication with the receiving port of the extrusion chamber; and
   advancing means for selectively advancing extrudate ingredients residing in the feed channels through the dispensing openings of the channels and into the receiving port of the extrusion chamber.

17. The feeding apparatus as defined in claim 16, wherein the feed channels define interior passages and further comprise chute members having open top sections, said chute members being thereby configured to permit access to the interior passages through said top sections.

18. The feeding apparatus as defined in claim 16, wherein the advancing means comprises vibration means for vibrating the feed channels to thereby cause extrudate ingredients residing in the channels to move through the dispensing openings of the channels and into the receiving port of the extrusion chamber.

19. The feeding apparatus as defined in claim 16, wherein at least one of the discharge passages comprises a duct formed on one of the hoppers and an extension sleeve slidably disposed around the duct and extending downwardly into one of the feed channels, said extension sleeve being selectively slidable upwardly and downwardly to thereby enable a user to selectively increase and reduce a rate of advancement of at least one of the extrudate ingredients into the receiving port of the extrusion chamber.

20. A method for manufacturing organically based polymer/thermoplastic products with a rotational screw cooking extruder, said cooking extruder having an extrusion chamber with a receiving port for receiving the ingredients thereinto and a rotatable screw member disposed within the chamber for advancing the ingredients through an ejection port of the chamber, said process comprising the steps of:

(a) introducing a plurality of organically based individual polymer/thermoplastic extrudate ingredients separately and simultaneously into the receiving port of the extrusion chamber of the cooking extruder; and (b) simultaneously, (i) rotating the screw member of the cooking extruder, (ii) introducing the individual polymer/thermoplastic ingredients separately and simultaneously along a plurality of segregated movement paths into the receiving port as in step (a), and guiding and maintaining said plurality of ingredients in a desired orientation as said ingredients are introduced into said receiving port, and (iii) otherwise operating the cooking extruder to thereby introduce cooking heat and compression into the ingredients in such a manner that said ingredients become combined and subsequently ejected from the ejection port of the chamber in the form of an organically based polymer/thermoplastic extrudate.

21. An extruding apparatus comprising:

a cooking extruder including an extrusion chamber having a receiving port for receiving extrudate ingredients, an ejection port formed on the chamber, and a rotatable screw member disposed within the chamber and being configured for compressing extrudate ingredients within the chamber and advancing said ingredients toward and through the ejection port;

feeding and guiding means for (i) separately introducing a plurality of individual extrudate ingredients separately and simultaneously along a plurality of segregated movement paths into the receiving port of the extrusion chamber, and (ii) guiding and maintaining said plurality of ingredients in a desired orientation as they are introduced into the receiving port.

22. An extruding apparatus comprising:

a cooking extruder including an extrusion chamber having a receiving port for receiving extrudate ingredients, an ejection port formed on the chamber, and a rotatable screw member disposed within the chamber and being configured for compressing extrudate ingredients within the chamber and advancing said ingredients toward and through the ejection port;

feeding means for separately introducing a plurality of individual extrudate ingredients separately and simultaneously along a plurality of segregated movement paths into the receiving port of the extrusion chamber, said feeding means comprising:

a plurality of hoppers;

a plurality of nonrotational channels disposed beneath the plurality of hoppers and extending into communication with the receiving port of the extrusion chamber, said nonrotational channels being characterized by an absence of rotational components;

at least one duct coupled to one of the hoppers and extending downwardly therefrom toward one of the nonrotational channel;

extension/retraction means for selectively extending and retracting the at least one duct in length.

23. The extruding apparatus as defined in claim 1, wherein the feeding means includes a plurality of channel members disposed in a side-by-side, substantially parallel orientation.

* * * * *